(12) United States Patent
Rose et al.

(10) Patent No.: US 10,621,103 B2
(45) Date of Patent: Apr. 14, 2020

(54) APPARATUS AND METHOD FOR HANDLING WRITE OPERATIONS

(71) Applicant: Arm Limited, Cambridge (GB)

(72) Inventors: Andrew Christopher Rose, Great Shelford (GB); Richard Roy Grisenthwaite, Cambridge (GB); Ali Ghassan Saidi, Austin, TX (US)

(73) Assignee: Arm Limited, Cambridge (GB)

( * ) Notice: Subject to any disclaimer, the term of this patent is extended or adjusted under 35 U.S.C. 154(b) by 36 days.

(21) Appl. No.: 15/831,609

(22) Filed: Dec. 5, 2017

(65) Prior Publication Data

US 2019/0171573 A1 Jun. 6, 2019

(51) Int. Cl.
*G06F 12/0837* (2016.01)
*G06F 12/0891* (2016.01)
(Continued)

(52) U.S. Cl.
CPC ...... *G06F 12/0891* (2013.01); *G06F 9/30087* (2013.01); *G06F 9/3857* (2013.01);
(Continued)

(58) Field of Classification Search
CPC .......................... G06F 12/0831; G06F 12/0837
See application file for complete search history.

(56) References Cited

U.S. PATENT DOCUMENTS 5,404,482 A 4/1995 Stamm et al.
5,802,582 A 9/1998 Ekanadham et al.
(Continued)

FOREIGN PATENT DOCUMENTS

EP 3 531 292 8/2019
GB 2515146 12/2014
(Continued)

OTHER PUBLICATIONS

Office Action dated Dec. 18, 2018 in IL Application No. 250300, 3 pages.
(Continued)

*Primary Examiner* — Edward J Dudek, Jr.
*Assistant Examiner* — Andrew Russell
(74) *Attorney, Agent, or Firm* — Nixon & Vanderhye P.C.

(57) ABSTRACT

An apparatus and method are provided for handling write operations. The apparatus has a first processing device for executing a sequence of instructions, where the sequence comprises at least one instruction to activate a software protocol to establish an ownership right for writing data to a first memory region, and at least one write instruction executed following establishment of the ownership right, in order to perform one or more write operations to output write data for storage in at least one memory location within the first memory region. A writeback cache associated with the first processing device is used to store the write data output during the one or more write operations. Coherency circuitry is coupled to the writeback cache and to at least one further cache associated with at least one further processing device. The first processing device is responsive to a trigger event to initiate a clean operation in order to cause the write data to be written from the writeback cache to memory. Further, the coherency circuitry is responsive to the clean operation to interact with the at least one further cache to implement a hardware protocol in order to make the write data visible to the at least one further processing device. This can provide a very efficient and cost effective mechanism for implementing cache coherency in certain systems.

17 Claims, 10 Drawing Sheets

(51) Int. Cl.

| | |
|---|---|
| *G06F 12/126* | (2016.01) |
| *G06F 12/0831* | (2016.01) |
| *G06F 9/38* | (2018.01) |
| *G06F 9/30* | (2018.01) |
| *G06F 9/52* | (2006.01) |
| *G06F 12/0804* | (2016.01) |
| *G06F 9/46* | (2006.01) |
| *G06F 12/0817* | (2016.01) |
| *G06F 12/14* | (2006.01) |

(52) U.S. Cl.
CPC .......... *G06F 9/526* (2013.01); *G06F 12/0804* (2013.01); *G06F 12/0831* (2013.01); *G06F 12/0837* (2013.01); *G06F 12/126* (2013.01); *G06F 9/3863* (2013.01); *G06F 9/467* (2013.01); *G06F 12/0817* (2013.01); *G06F 12/1466* (2013.01); *G06F 2212/1016* (2013.01); *G06F 2212/1041* (2013.01); *G06F 2212/1056* (2013.01); *G06F 2212/163* (2013.01)

(56) References Cited

U.S. PATENT DOCUMENTS

| | | | |
|---|---|---|---|
| 7,360,031 | B2 | 4/2008 | Lakshmanamurthy et al. |
| 7,877,549 | B1* | 1/2011 | Panwar ................ G06F 9/52 710/200 |
| 2003/0079094 | A1 | 4/2003 | Rajwar |
| 2004/0187123 | A1 | 9/2004 | Tremblay et al. |
| 2007/0156994 | A1 | 7/2007 | Akkary et al. |
| 2010/0023704 | A1 | 1/2010 | Christie et al. |
| 2012/0079211 | A1 | 3/2012 | Laycock et al. |
| 2012/0198205 | A1 | 8/2012 | Eilert |
| 2013/0091331 | A1 | 4/2013 | Moraru et al. |
| 2013/0227201 | A1 | 8/2013 | Talagala |
| 2013/0262775 | A1* | 10/2013 | Asaro ................ G06F 12/0877 711/135 |
| 2014/0019689 | A1 | 1/2014 | Cain, III |
| 2017/0192886 | A1 | 7/2017 | Boehm |
| 2017/0220478 | A1 | 8/2017 | Saidi et al. |
| 2018/0060233 | A1* | 3/2018 | Parmer ............... G06F 12/0808 |

FOREIGN PATENT DOCUMENTS

| | | |
|---|---|---|
| JP | H07-271669 | 10/1995 |
| JP | H10-275112 | 10/1998 |
| JP | 2006-91995 | 4/2006 |

OTHER PUBLICATIONS

International Search Report and Written Opinion of the International Searching Authority dated Feb. 25, 2019 in PCT/GB2018/053442, 18 pages.
International Search Report for PCT/GB2015/051823 dated Sep. 17, 2015, 4 pages.
Written Opinion for PCT/GB2015/051823 dated Sep. 17, 2015, 5 pages.
Search Report for GB1413772.3 dated Feb. 5, 2015, 3 pages.
Condit et al., "Better I/O Through Byte-Addressable, Persistent Memory", *SOSP '09*, Oct. 11-14, 2009, 14 pages.
Moraru et al., "Consistent, Durable, and Safe Memory Management for Byte-addressable Non Volatile Main Memory", *TRIOS'13*, Nov. 3, 2013, 17 pages.
Pelley et al., "Memory Persistency", *ACM SIGARCH Computer Architecture News*, 42(3), Jun. 2014, 12 pages.
U.S. Appl. No. 15/501,278, filed Jun. 23, 2015, Saidi et al.
Final Office Action dated Nov. 20, 2018 in co-pending U.S. Appl. No. 15/501,278, 39 pages.
Office Action dated Apr. 18, 2019 in EP Application No. 15732907.9, 6 pages.
Office Action dated Jun. 21, 2018 in co-pending U.S. Appl. No. 15/501,278, 40 pages.
Final Office Action dated Nov. 13, 2019 in co-pending U.S. Appl. No. 15/501,278, 43 pages.
Examination Report for GB Application No. 1413772.3 dated Oct. 30, 2019, 5 pages.
Office Action for JP Application No. 2017-504748 dated Jun. 11, 2019 and English translation, 7 pages.
Office Action dated Jul. 15, 2019 in co-pending U.S. Appl. No. 15/501,278, 46 pages.

* cited by examiner

DIRECTORY MAINTAINED BY COHERENCY CIRCUITRY

| MEMORY ADDRESS | CACHE N-1 | ... | CACHE 1 | CACHE 0 |
|---|---|---|---|---|
| ADDRESS X | ✓ | - - - | ✗ | ✓ |
| ADDRESS Y | ✗ | | ✗ | ✓ |
| | | | | |
| | | | | |

100 — ADDRESS X row
105 — ADDRESS Y row
60

FIG. 2

LOCK STORAGE

| MEMORY REGION | LOCK INDICATION |
|---|---|
| REGION 0 | SET |
| REGION 1 | CLEAR |
| REGION 2 | CLEAR |
| ⋮ | ⋮ |

110 — REGION 0
115 — REGION 1
120 — REGION 2
80

FIG. 3

GET LOCK
WRITE
CLEAN
RELEASE LOCK

FIG. 7A

GET LOCK
START
WRITE
WRITE
.
.
END
RELEASE LOCK

FIG. 7B

GET LOCK
WRITE
CLEAN
WRITE
CLEAN
.
.
RELEASE LOCK

FIG. 7C

GET LOCK
WRITE
WRITE
.
.
CLEAN
CLEAN
.
.
RELEASE LOCK

FIG. 7D

APPARATUS AND METHOD FOR HANDLING WRITE OPERATIONS

BACKGROUND

The present technique relates to an apparatus and method for handling write operations.

Data processing systems will often include multiple processing devices that can perform data processing operations on data, and those various processing devices may be arranged to have access to shared data in memory. Often the processing devices will include one or more levels of local cache in which the data manipulated by those processing devices may be cached to allow quicker access to that data than would be possible were the data required to be fetched from memory each time.

However, the presence of local caches can give rise to coherency issues where there is the potential for one processing device to access out-of-date data when the most up-to-date version is cached in another processing device's local cache.

Whilst hardware cache coherency mechanisms have been developed for such situations, those mechanisms can be relatively expensive to implement in terms of hardware area and/or execution time.

SUMMARY

In a first example configuration, there is provided an apparatus comprising: a first processing device to execute a sequence of instructions, said sequence comprising at least one instruction to activate a software protocol to establish an ownership right for writing data to a first memory region, and at least one write instruction executed following establishment of the ownership right, in order to perform one or more write operations to output write data for storage in at least one memory location within the first memory region; a writeback cache associated with the first processing device and arranged to store the write data output during the one or more write operations; and coherency circuitry coupled to the writeback cache and to at least one further cache associated with at least one further processing device; wherein: the first processing device is responsive to a trigger event to initiate a clean operation in order to cause the write data to be written from the writeback cache to memory; and the coherency circuitry is responsive to the clean operation to interact with said at least one further cache to implement a hardware protocol in order to make the write data visible to said at least one further processing device.

In a further example configuration, there is provided a method of handling write operations in an apparatus having a first processing device, a writeback cache associated with the first processing device, and coherency circuitry coupled to the writeback cache and to at least one further cache associated with at least one further processing device, the method comprising: executing on the first processing device at least one instruction to activate a software protocol to establish an ownership right for writing data to a first memory region, and at least one write instruction executed following establishment of the ownership right, in order to perform one or more write operations to output write data for storage in at least one memory location within the first memory region; storing within the writeback cache the write data output during the one or more write operations; responsive to a trigger event, causing the first processing device to initiate a clean operation in order to cause the write data to be written from the writeback cache to memory; and responsive to the clean operation, causing the coherency circuitry to interact with said at least one further cache to implement a hardware protocol in order to make the write data visible to said at least one further processing device.

In a yet further example configuration, there is provided an apparatus comprising: first processing means for executing a sequence of instructions, said sequence comprising at least one instruction to activate a software protocol to establish an ownership right for writing data to a first memory region, and at least one write instruction executed following establishment of the ownership right, in order to perform one or more write operations to output write data for storage in at least one memory location within the first memory region; a writeback cache means associated with the first processing means, for storing the write data output during the one or more write operations; and coherency means for coupling to the writeback cache means and to at least one further cache means associated with at least one further processing means; wherein: the first processing means, responsive to a trigger event, for initiating a clean operation in order to cause the write data to be written from the writeback cache means to memory; and the coherency means, responsive to the clean operation, for interacting with said at least one further cache means to implement a hardware protocol in order to make the write data visible to said at least one further processing means.

BRIEF DESCRIPTION OF THE DRAWINGS

The present technique will be described further, by way of illustration only, with reference to examples thereof as illustrated in the accompanying drawings, in which:

FIG. 2 illustrates one example of the directory that may be maintained by the coherency circuitry of FIG. 1;

FIG. 3 illustrates one example of lock storage that may be provided within memory of the system of FIG. 1;

FIGS. 7A to 7D illustrate example sequences of code that may be executed by one of the processing devices in an example arrangement;

DESCRIPTION OF EXAMPLES

Figure 1:
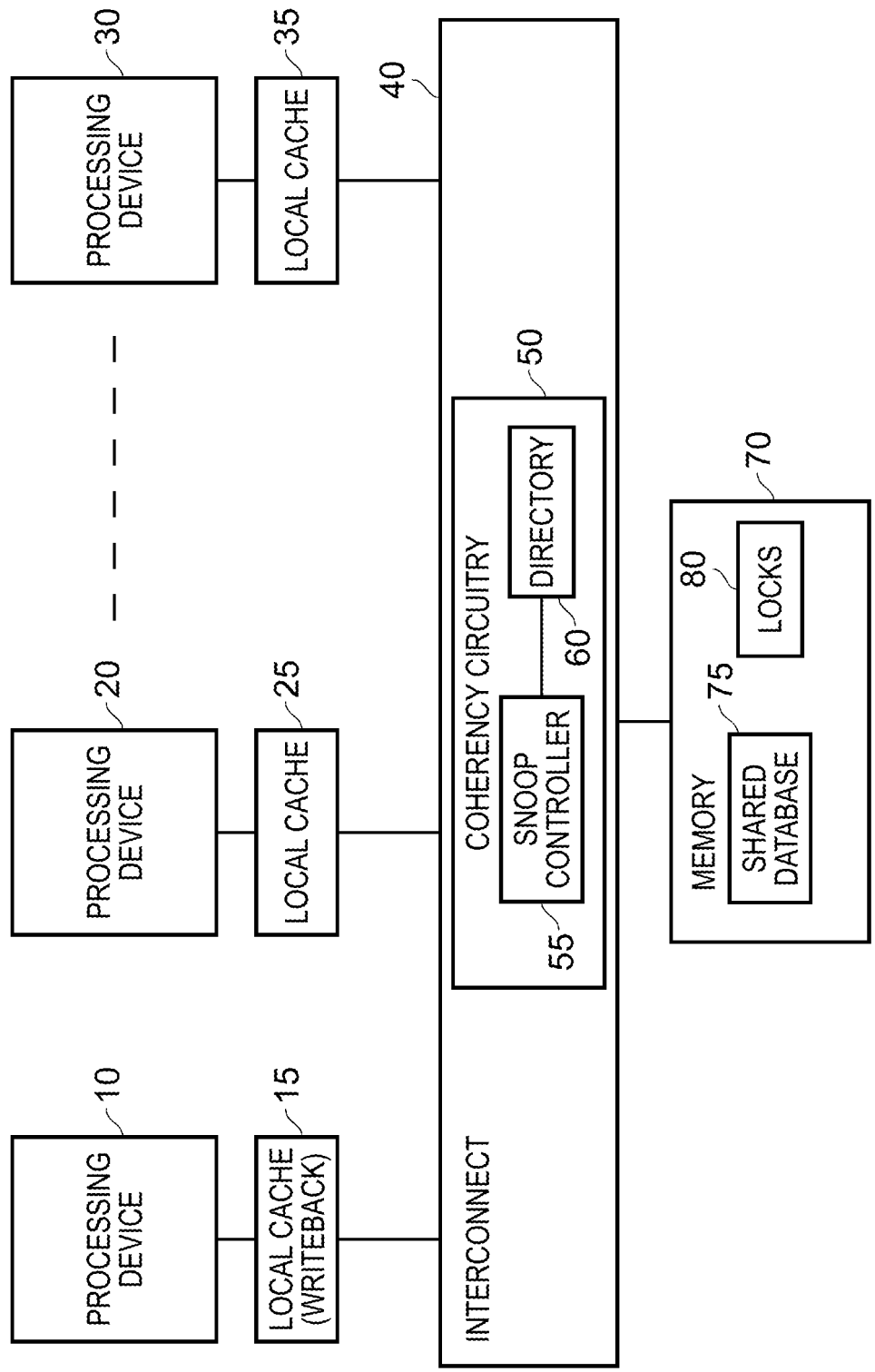
FIG. 1 is a block diagram of an example system in which the techniques described herein can be implemented.

In systems having multiple processing devices with their own local cache structures, a cache coherency protocol is typically implemented in order to ensure that each processing device has the same view of the data that is shared amongst the processing devices. Such a cache coherency protocol needs to ensure that different processing devices cannot update data associated with a memory location in conflicting ways, which could for example arise if two different processing devices were allowed to perform a write operation in respect of the same data at the same time (which may be referred to as a "racing writes" condition). Hence, when a write operation is required in respect of data at a particular memory address, then in accordance with a known hardware cache coherency scheme, the processing device that wishes to perform the write operation notifies the coherency circuitry, so that the coherency circuitry then performs any necessary steps, having regards to any cached copies of that data that may be held by other processing devices, in order to ensure that the requesting processing device can then perform the write operation without the risk of any of the other processing devices performing a conflicting write in respect of that memory address. The coherency circuitry can also ensure that, whenever any processing device subsequently requests access to the memory address, it will obtain the most up-to-date version of the data.

However, in some systems where data is shared amongst multiple processing devices, the inventors realised that software schemes may also be in place that can effectively ensure that only one processing device has the capability to write to a particular memory location at any point in time. Purely by way of example, in rack-scale computing systems, where large databases of data may be shared amongst the various processing devices, software techniques may be used to control which processing device is able to write to any particular memory location at any particular point in time. Hence, the inventors realised that in such systems, some of the functionality normally associated with the cache coherency mechanism would no longer need to be performed by coherency circuitry.

In particular, the inventors observed that the functionality performed by a hardware coherency mechanism essentially involved steps to establish a processing device's right to write data, and further steps taken after a write operation is performed to make the updated write data visible to other processing devices. In systems that already provided a software mechanism to effectively control which processing device can write to any particular memory location, the inventors realised that cache coherency can effectively be maintained without requiring the cache coherency protocol to be fully implemented in hardware. In particular, the steps required to establish the right to write data can be performed in software, with a hardware mechanism then being used to make sure updated write data is made visible to other processing devices. This can lead to a significant reduction in the cost (in terms of hardware area and/or execution time) associated with providing cache coherency support within a system.

In one example arrangement, an apparatus can be provided comprising a first processing device that is arranged to execute a sequence of instructions, where the sequence comprises at least one instruction to activate a software protocol to establish an ownership right for writing data to a first memory region, and at least one write instruction executed following establishment of the ownership right, in order to perform one or more write operations to output write data for storage in at least one memory location within the first memory region. The first processing device has a writeback cache associated with it, in which the write data output during the one or more write operations is stored. Further, coherency circuitry is provided that is coupled to the writeback cache and to at least one further cache associated with at least one further processing device.

Through use of the software protocol, it can be ensured that when the first processing device is given the ownership right in respect of the first memory region, no other processing devices will be able to perform conflicting write operations to that first memory region. However, there is still the need to ensure that the write data produced by the first processing device is made visible to the other processing devices.

In accordance with the described examples this is achieved by the first processing device being responsive to a trigger event to initiate a clean operation in order to cause the write data to be written from the writeback cache to memory. The "cleaning" of an item of write data from the writeback cache to memory should be understood here to mean that the modified copy of that data item stored in the writeback cache (i.e. the write data referred to herein) is used to update the original data item stored in memory. In addition to the cleaning operation being performed, the coherency circuitry is then arranged to be responsive to the clean operation to interact with the at least one further cache in order to implement a hardware protocol to make the write data visible to the at least one further processing device.

In accordance with such an approach, the software programmer writing the instructions to be executed on the processing devices needs to be aware of the software protocol required to establish an ownership right, and in particular to include appropriate instructions within the sequence of instructions executed by the various processing devices so that when write operations are to be performed in respect of the first memory region, the relevant processing device first seeks to establish the ownership right using the software protocol. This means that the hardware coherency circuitry does not need to consider the issue of racing writes, since the software is responsible for avoiding such issues. However, a hardware protocol can then be implemented by the coherency circuitry to handle the issue of making the write data visible to the at least one further processing device. Since the coherency circuitry can undertake the required steps directly in response to notification of the clean operation, the software executing on the processing devices does not have to take any steps to clean and/or invalidate copies of data held by other processing devices before performing the write operations, or to take steps to invalidate copies on the other processing devices after the data has been written.

As a result, the approach adopted is far less onerous from a software point of view than a situation where the entire cache coherency protocol were to be implemented in a software manner. Further, it is significantly less costly (in terms of hardware area and/or execution time) to implement than a system where the full cache coherency protocol is implemented in hardware, since the hardware protocol required only needs to be concerned with the issue of making write data visible to other processing devices, with the establishment of the right to write being devolved to the software. The hardware protocol implemented by the coherency circuitry can be made entirely transparent to the software programmer, as no instructions need to be added to the code executed on the processing devices in order to implement that functionality, instead the coherency circuitry implementing the required functionality entirely in hardware triggered by the clean operation.

Hence, in accordance with the above described technique, it will be appreciated that the apparatus can be arranged to implement a cache coherency protocol in respect of the first memory region through a combination of the software protocol triggered by the first processing device and the hardware protocol implemented by the coherency circuitry. This can provide a very efficient mechanism for implementing cache coherency, particularly in systems that already ensure via appropriate software mechanisms that only one processing device can write to any particular memory location at a time.

The manner in which the coherency circuitry responds to the clean operation can be varied dependent on implementation. In one example, the coherency circuitry is arranged, in response to the clean operation, to cause the at least one further cache to invalidate any cache entry whose content is associated with the at least one memory location of the write data. It is sufficient to simply invalidate those cache entries, since at this point it is known that the most up-to-date data for the memory location(s) in question is that that has been produced by the first processing device during performance of the one or more write operations. Further, the clean operation will cause that up-to-date version of the data to be output to memory, and accordingly in due course when any of the at least one further processing devices requests data for the at least one memory location, there will be a miss in its local cache, and the correct data will be retrieved from memory.

Whilst invalidating the entries in the above described manner is the simplest approach to take, if desired a cache entry whose content is associated with the at least one memory location of the write data could instead be updated to store the up-to-date write data as produced by the first processing device, rather than invalidating the entry. This would avoid the data subsequently having to be re-requested from memory, if that data were required at some future point.

The coherency circuitry can be arranged to operate in a variety of ways. For example, it may be arranged to respond to the clean operation merely by broadcasting an invalidation or update request to all caches associated with further processing devices, whether or not those caches may be caching a copy of the data affected by the write operations. However, in an alternative embodiment the coherency circuitry can be arranged to perform a more targeted operation. In particular, in one example the at least one further cache comprises a plurality of caches, and the coherency circuitry maintains a record providing, for each cache in said plurality, an indication of the memory locations whose data is cached by that cache. The coherency circuitry is then arranged to reference the record when determining which caches amongst said plurality to interact with in order to make the write data visible to the at least one further processing device.

In one such example where a record is maintained by the coherency circuitry, the coherency circuitry may take the form of snoop circuitry. Snoop circuitry is a known type of cache coherency circuitry that can maintain an indication of which memory addresses are cached by the various caches in the system, and use that information to target snoop requests to particular caches in order to implement a cache coherency protocol. However, in accordance with the above described techniques, at least for the first memory region the snoop circuitry is not required to implement a full cache coherency protocol, since the aspect of establishing the right to write data is instead devolved to the software protocol.

There are a number of ways in which the software protocol can be implemented within the apparatus. In one example, the apparatus further comprises lock storage to maintain lock indications for a number of memory regions, and the software protocol is arranged, when activated by the first processing device, to determine whether the lock indication for the first memory region is clear. In the event that the lock indication is clear, the software protocol then causes the lock indication to be set for the first memory region and identifies to the first processing device that the first processing device has the ownership right for the first memory region.

Accordingly, the lock indication for each memory region can be viewed as a form of indication held as a separate variable, that can be set to indicate when the associated memory region is in the process of being updated.

Each memory region tracked by the lock storage may comprise an individual memory address, or a series of memory addresses, dependent on implementation. Each memory location is identified by a memory address, and hence there may be one or more memory locations within each memory region tracked by the lock storage.

In one example arrangement, upon notification from the coherency circuitry that the write data has been made visible to the at least one further processing device, the first processing device is arranged to release the ownership right. Hence, the first processing device will retain the ownership right once it has been granted it, until it can be ensured that the write data generated by that first processing device is guaranteed to be visible to any of the other processing devices. It should be noted that in some instances this does not mean that the write data has actually been written to main memory, provided it has reached a point of coherence within the system (for example a buffer storage where the data is temporarily stored before it is written to memory) and it can hence be guaranteed that when any of the other processing devices request the data at the affected memory location, they will obtain that up-to-date write data from the point of coherence if it has not yet been written to main memory.

The trigger event used to initiate the clean operation by the first processing device can take a variety of forms. For example, the trigger event may occur due to execution by the first processing device of a cleaning instruction in the sequence of instructions, execution of that cleaning instruction causing the clean operation to be performed. As another example, the trigger event may arise if an eviction event is triggered in respect of an entry of the writeback cache containing the write data. This could for example occur due to capacity issues within the writeback cache, and in particular a victim entry needing to be selected to make space for new data to be allocated into the cache. It is possible for example that such an eviction event might target as a victim entry an entry that has been written to by one of the write operations, prior to the first processing device executing a cleaning instruction to actively clean that entry.

The cleaning instruction can take a variety of forms. For example, in a simple case there may be a cleaning instruction associated with each write instruction, such that once the write data is written to a required memory location, the following clean instruction then identifies that memory location.

However, in an alternative arrangement, a single cleaning instruction may be arranged to trigger cleaning of multiple entries of the writeback cache, and in such instances the apparatus may further comprise a storage unit to store information enabling the multiple entries to be identified. For example, the techniques described in commonly owned co-pending U.S. patent application Ser. No. 15/501,278 can be utilised, where the cleaning instruction can take the form of the end instruction defined therein, which causes a number of identified entries within the writeback cache that have been subjected to write operations to then be cleaned to main memory. In the examples discussed in the above co-pending case, the memory forms a non-volatile memory forming a point of persistence within the system, and the execution of the end instruction causes the write data from the identified entries to be propagated to the point of persistence. However, in the present technique the end instruction can be used irrespective of the form of the memory, and when combined with the above described mechanisms can provide a very efficient technique for maintaining cache coherency in association with write data produced by a sequence of write operations, with the software protocol ensuring that no other processing device can perform conflicting write operations within the memory region, and the hardware coherency circuitry then being responsive to the clean operation to make all of the write data visible to the at least one further processing device.

In one example arrangement, the storage unit may be arranged to store indications of the write operations performed by the first processing device, the cleaning instruction may be an end instruction in the sequence of instructions, and the first processing device may be responsive to execution of the end instruction by: causing the write data that is the subject of each write operation for which an indication is stored in the storage unit to be cleaned from the writeback cache to the memory; and clearing the indications of the write operations stored in the storage unit.

By using the above described end instruction technique, in situations where the programmer of the data processing apparatus wishes to ensure that a particular ordering of write operations (initiated by the execution of write instructions) will take place with respect to memory, this can be done by the addition of the end instruction into the sequence of instructions given by the programmer to define the data processing operations which the apparatus should carry out.

In some example arrangements, the first processing device is further arranged to cause the indications of the write operations performed by the first processing device to be stored in the storage unit after a begin instruction in the sequence of instructions. Thus a further instruction may be added to the instruction set to which the processing device is responsive, which enables the system programmer to encapsulate a "write set" of write operations (preceded by the begin instruction and concluded by the end instruction). It can then be ensured, in terms of the operation of the writeback cache and not by the operation of the first processing device (which may, for scheduling reasons, vary the order in which particular instructions are executed) that the write order (of this write set with respect to other write operations) desired by the programmer will be respected in the content of main memory.

In one example arrangement, the first processing device may be arranged to only perform a write operation to the first memory region when the ownership right for writing data to the first memory region has been established, and a pending write instruction specifying a memory location within the first memory region is preceded by the begin instruction and followed by the end instruction.

Whilst the above described techniques can be adopted in respect of all of the memory regions within memory, in other examples the above described techniques may be restricted to particular memory regions, and for other memory regions a full hardware cache coherency scheme may be implemented if desired. Hence, in one such arrangement, for at least one further memory region, the cache coherency protocol is implemented solely by the coherency circuitry, and the first processing device is arranged to obtain exclusive write access to the at least one further memory region via steps performed by the coherency circuitry in respect of the at least one further cache. Hence, for the at least one further memory region, the software protocol is not used, and instead steps taken directly by the coherency circuitry with respect to the various other caches within the system are used to ensure that the first processing device obtains exclusive write access to that memory region before performing write operations.

Particular examples will now be described with reference to the Figures.

FIG. 1 is a block diagram of a system in which the above described techniques may be implemented. Multiple processing devices 10, 20, 30 are arranged to have access to memory 70. Each processing device may be provided with one or more levels of local cache 15, 25, 35, within which to temporarily store local copies of data being processed by the processing device. Each data value has an associated memory address identifying a memory location within the memory 70, and in accordance with standard practice a copy of a data value is typically stored within a cache along with an indication of that memory address. If the data in the local cache is updated, for example as a result of one or more write operations being performed by the processing device in respect of that data, then the updated data can be written back to memory 70. The caches can be arranged in a variety of ways. For example, if a cache is arranged as a write through cache, then any update made to the data stored in a cache line is also propagated on via the interconnect 40 to memory 70 in order to cause the update to be replicated in memory without delay. However, it is common for at least one level of local cache to be arranged as a writeback cache, where updated versions of data held in the cache are not immediately propagated on to memory. Instead, a dirty flag can be associated with the cache lines containing data that is more up-to-date than memory, so that when those cache line contents are subsequently evicted from the cache, the necessary updates can be made to memory. The techniques described herein may be applied in relation to any processing device having at least one level of local cache that is arranged as a writeback cache. In FIG. 1, the cache 15 is identified as a writeback cache, but in one example arrangement each of the local caches 15, 25, 35 may be writeback caches.

Due to the ability of the individual processing devices to locally cache copies of data in their respective local caches 15, 25, 35, it is necessary to implement a cache coherency protocol in order to ensure that conflicting write operations do not take place within the different processing devices, in respect of the same memory location, and to ensure that each processing device has the same view of the shared data. In particular, whilst some of the data held in memory may be specific to a particular processing device, it is often the case that the processing devices will share some of the data held in memory. As an example, the memory may include a shared database 75, and each of the processing devices may be allocated processing tasks in relation to information held in the shared database 75. It is important to ensure that particular data in the shared database is not subjected to conflicting updates by multiple processing devices, and that each of the processing devices is provided with a consistent view of the data held in the shared database 75.

In one example arrangement, coherency circuitry 50 can be provided within the interconnect 40 for implementing at least part of the cache coherency protocol. When implementing the cache coherency protocol, there are essentially two tasks that need to be undertaken. In particular, when a processing device wishes to perform a write operation in respect of a particular memory location, it is necessary to ensure that the processing device wishing to make the write operation has established the right to perform that write operation in respect of that memory location. This can be used to avoid the prospect of conflicting writes taking place in respect of the same memory location. Furthermore, once the data for a particular memory location has been updated via such a write operation, it is important to ensure that whenever any other processing device requests access to that memory location it sees the updated data. Hence, as part of the cache coherency protocol, it is necessary to ensure that the result of any write operations are made visible to all of the other processing devices.

Whilst it is possible to arrange coherency circuitry within the interconnect to fully implement in hardware a cache coherency protocol to take account of the above required functionality, in accordance with the techniques described herein, for at least some memory regions, the implementation of the cache coherency protocol is split between software and hardware. In particular, the coherency circuitry 50 can be used to ensure that updated data generated by one processing device as a result of a write operation is made visible to the other processing devices. However, obtaining of the right to write data to a memory location is devolved to a software protocol, so that the coherency circuitry 50 does not need to consider that aspect. As will be discussed in more detail later, the software protocol can use a lock-based mechanism using locks 80 maintained in memory 70 in order to ensure that, prior to any processing device performing a write operation to a memory address within a memory region whose cache coherency is controlled by the split software/hardware mechanism, that processing device obtains an ownership right in respect of the relevant memory region. By such an approach, the software is tasked with avoiding racing write conditions arising in respect of such a memory region, and the coherency circuitry then implements a hardware protocol in order to make any updated write data visible to the other processing devices.

In accordance with the technique described herein, once a write operation, or in some instances a series of write operations, have been performed, in order to produce updated write data within one or more memory locations of a specified memory region, a clean operation is triggered in order to cause that updated write data within the local writeback cache 15 to be propagated through to the appropriate memory locations within the memory 70. In one example, the memory is non-volatile memory, and hence represents a point of persistence within the system. In particular, once the data has been committed to memory 70, that data will remain even if the power is removed from the system. The clean operation can hence cause the data to be propagated through to the point of persistence within the system. However, in another example the memory need not be a non-volatile memory.

In accordance with the described techniques, the coherency circuitry is responsive to the initiation of the clean operation to then take a number of coherency actions in order to make the write data visible to the other processing devices.

For example, consider the situation where the processing device 10 executes an instruction to activate the software protocol in order to establish an ownership right for that processing device to write data to a first memory region, and then performs one or more write operations to at least one memory location within the first memory region, causing updated write data to be stored within the local writeback cache 15. The processing device 10 may then execute a clean instruction to initiate a clean operation, in order to cause all of the affected write data to be propagated through to the memory 70 for storing at the appropriate memory location (s). The coherency circuitry can then respond to that clean operation by taking steps in association with the local caches 25, 35 of the other processing devices 20, 30 to ensure that those processing devices will see the updated data if they require access to that data. In one scenario, the coherency circuitry may be arranged to merely propagate invalidation requests to each of the local caches 25, 35, specifying the affected memory location(s). Each local cache will then perform a lookup in respect of each specified memory location to determine whether an entry exists in the cache for that memory location. If so, the current contents will then be invalidated within the local cache. This will ensure that if the processing device subsequently makes a request for data at that memory address, a miss will be detected in the local cache, causing the data to then be obtained from memory, as a result of which the correct data will be received by the processing device 20, 30.

Whilst in a simple arrangement the coherency circuitry may just broadcast invalidation requests to all of the other local caches, in an alternative embodiment the coherency circuitry may take the form of snoop circuitry that includes a snoop controller 55 and an associated directory 60. The directory is maintained by the snoop controller to provide an indication of the memory locations for which data is cached by each of the local caches 15, 25, 35. Accordingly, in regards to the memory location or memory locations affected by the clean operation, the snoop controller 55 can perform a lookup within the directory to identify which of the various local caches might have a cached local copy of the affected data, and hence can target the invalidation requests to the relevant caches rather than merely broadcasting the invalidation request to every cache.

By such an approach, it can be seen that the coherency circuitry can respond to the clean operation to ensure that at the point the updated write data is written to the memory, it can be ensured that all of the processing devices will have a consistent view of that data.

In the period prior to the clean operation being performed, and whilst the processing device 10 is executing one or more write instructions to generate updated write data for one or memory locations, the software protocol can regulate access by other processing devices to those one or more memory locations. In some instances, the intended software usage of the data may be such that the software protocol allows another processing device to read the old value of the data from memory, whilst in other instances such a read operation may be prohibited at that time.

FIG. 2 is a diagram schematically illustrating one example arrangement of the directory 60 of FIG. 1. In this example, the directory has a number of entries 100, 105, each entry identifying a memory address or a series of memory addresses and then identifying which caches may contain a copy of data within that memory address or series of memory addresses. This can be used by the snoop controller to determine which local caches need to be subjected to an invalidation operation in response to the earlier mentioned clean operation. In the example of FIG. 2, a tick is used to indicate that the associated cache may hold a cached copy, and a cross is used to indicate that the associated cache does not hold a copy. It will be appreciated that the ticks and crosses can be encoded by any suitable value, for example a logic one value may indicate a tick and a logic zero value may indicate a cross.

It will be appreciated that FIG. 2 merely illustrates one example arrangement of the directory 60, and any other suitable arrangement could be used to provide information to the snoop controller as to which caches need to be subjected to invalidation operations in response to a received clean operation.

FIG. 3 illustrates an example arrangement of the lock storage 80 that may be used. The lock storage can contain a plurality of entries 110, 115, 120, each relating to a particular memory region. A lock indication can be maintained for each memory region to identify whether at least one memory address within that region is in the process of having its data value updated. If the lock indication is set, this indicates that data for at least one memory address within the region is being updated, whereas if the lock indication is clear, this indicates that none of the addresses within the region contain data that is in the process of being updated.

When a processing device wishes to perform a write operation in respect of a memory address within one of the regions governed by the lock storage, an instruction will be executed by that processing device in order to seek to set the associated lock indication. If the associated lock indication is currently clear, it will be set, and an acknowledgment will be returned to the processing device, this in effect identifying to the processing device that it has now established an ownership right for the associated memory region, and accordingly is free to perform write operations in respect of that memory region. However, if the lock indication is already set, then the processing device will be prevented from continuing beyond the instruction that is seeking to set a lock, and in particular will not be allowed at that stage to execute any write instructions that seek to write to a memory address within the relevant region. In one example, execution will stall until such time as the lock indication for the relevant region returns to the clear state, at which point it can then be set again, and an acknowledgement issued to the processing device to identify that it now has ownership right in respect of the memory region, whereafter the write instruction(s) can then be executed. By such an approach, a software protocol can hence be used to maintain ownership rights for a plurality of memory regions, so as to ensure that at any particular point in time, only one processing device is given the right to perform write operations in respect of memory locations within each such region. This simplifies the operations required of the coherency circuitry 50, since it does not need to take any steps to ensure exclusive ownership by a particular processing device, and instead merely needs to respond to the subsequent clean operations to ensure that the processing devices have a consistent view of the data after it has been updated.

Figure 4A:
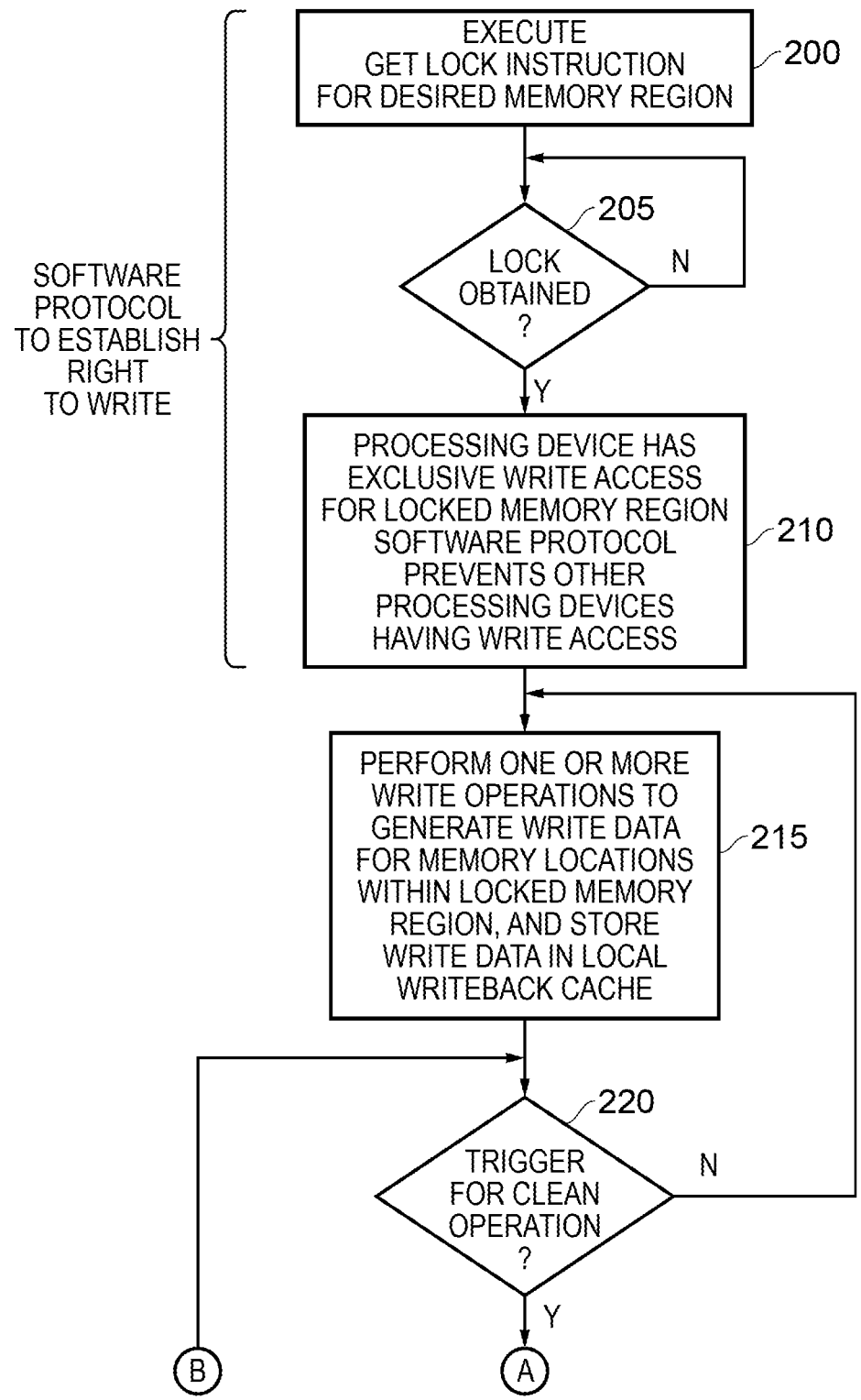
FIGS. 4A and 4B set out a flow diagram of a process that may be performed within a processing device when performing one or more write operations.
Figure 4B:
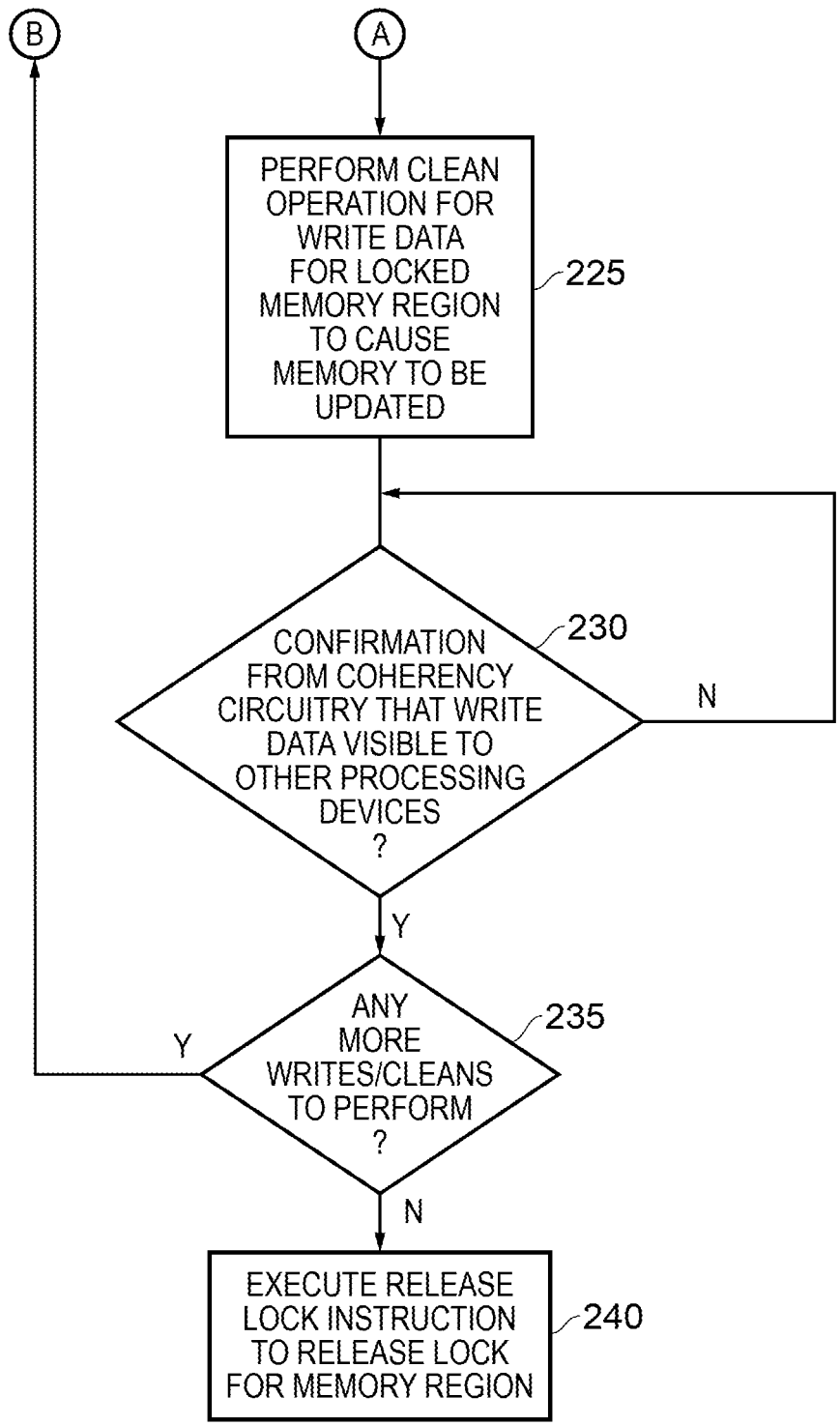

FIGS. 4A and 4B provide a flow diagram illustrating steps performed within a processing device in one example arrangement, when that processing device wishes to update data within a particular memory region for which the combined software/hardware mechanisms are used to implement cache coherency.

At step 200, a get lock instruction is executed by the processing circuitry in respect of the desired memory region. This causes the locks 80 within the memory to be accessed and in particular the lock indication state for the relevant region to be assessed. If the lock indication is already set, then the process stalls at step 205 until such time as it is determined that the lock indication is currently clear, at which point it can then be set in order to indicate that the lock has been obtained by the processing device executing the get lock instruction. Once the lock is obtained, this effectively means that the requesting processing device has established an ownership right for writing data to locations within the desired memory region, as indicated by step 210. At this stage, the software protocol prevents other processing devices having write access to the memory region in question, since if any of those other processing devices were to execute a get lock instruction, it would be determined that the lock indication is already set, and accordingly they would be unable to obtain the lock for that memory region. Hence, steps 200, 205, 210 can be seen as implementing the software protocol to establish the right to write data.

Following step 210, then at step 215 the processing device can perform one or more write operations in order to generate write data for memory locations within the locked memory region, with the generated write data then being stored in the local writeback cache of the processing device. This process can continue until a trigger for a clean operation is detected at step 220.

In one example arrangement, the trigger for a clean operation can occur for a variety of reasons. For example, in a simple case, a separate clean instruction may be associated with each write instruction, so that the process performed is for the processing device to obtain the lock, to then perform a single write operation to a desired memory location, and then for a clean instruction to be executed to trigger the clean operation in respect of that write data. However, in another example arrangement, it may be possible to group together a series of write operations in respect of memory addresses within the locked memory region, with a single clean operation being triggered after those write operations have been performed. For example, one suitable mechanism for achieving this functionality is the mechanism described in commonly owned co-pending U.S. patent application Ser. No. 15/501,278, the entire contents of which are hereby incorporated by reference. In particular, the end instruction defined therein can be used as a clean instruction to trigger the clean operation, and if desired an associated begin instruction can be used to identify the beginning of the sequence of write instructions whose write data will need to be cleaned when the end instruction is encountered. A separate storage structure can be maintained to keep track of the memory locations that need to be cleaned in response to the end instruction.

As a yet further example of a trigger that can arise at step 220, this may be an eviction event targeting a cache entry that contains updated write data produced by a write operation performed at step 215. The eviction event may arise for example due to capacity issues within the local cache, where a victim entry needs to be selected to make room for new data to be allocated into the cache. When the victim entry is an entry containing the write data produced at step 215, then this can trigger the clean operation at step 220. If the earlier example arrangement is employed where a series of write operations are associated with begin and end instructions, then an eviction in respect of one of the affected cache entries can be used to cause a clean operation to be triggered in respect of at least that entry, or if desired can cause cleaning of all of the entries for which write data has been produced between the begin and end instructions, at the time the eviction trigger takes place.

When the trigger event occurs at step 220, then the process proceeds to step 225 where a clean operation is performed for the write data that has been produced in respect of the locked memory region, in order to cause the memory contents to be updated to reflect the updated data produced by the write operation(s).

As discussed earlier, the coherency circuitry 50 will respond to the presence of such a clean operation to perform invalidation operations in respect of any relevant entries in the local caches of the other processing devices in order to ensure that the write data is being written to memory will be made visible to all of the processing devices. At step 230, the processing device that has obtained the lock for the required memory region awaits a confirmation from the coherency circuitry that the write data is visible to the other processing devices. In situations where multiple cache entries may be cleaned during the clean process, confirmation will be awaited at step 230 that all of the relevant write data has been made visible to the other processing devices, i.e. that all of the required invalidation operations have been performed.

Once such a confirmation is received at step 230, then the clean operation is complete and at step 235 it is determined whether there are any more write operations or clean operations to be performed. This for example can be determined to be the case if there are one or more additional write instructions or clean instructions in the instruction sequence prior to an instruction whose execution causes the lock to be released. If there is at least one more write operation or clean operation to be performed, then the process proceeds to step 220 where it is determined whether there is a trigger for another clean operation, and if not the process returns to step 215 to perform one or more further write operations.

Once it is determined at step 235 that there are no more write or clean operations to be performed, then the processing circuitry may then be arranged to execute a release lock instruction to release the lock for the memory region at step 240. This is achieved by performing an access to the appropriate entry in the lock storage 80 in order to reset the lock indication for that region to the clear state.

Figure 5:
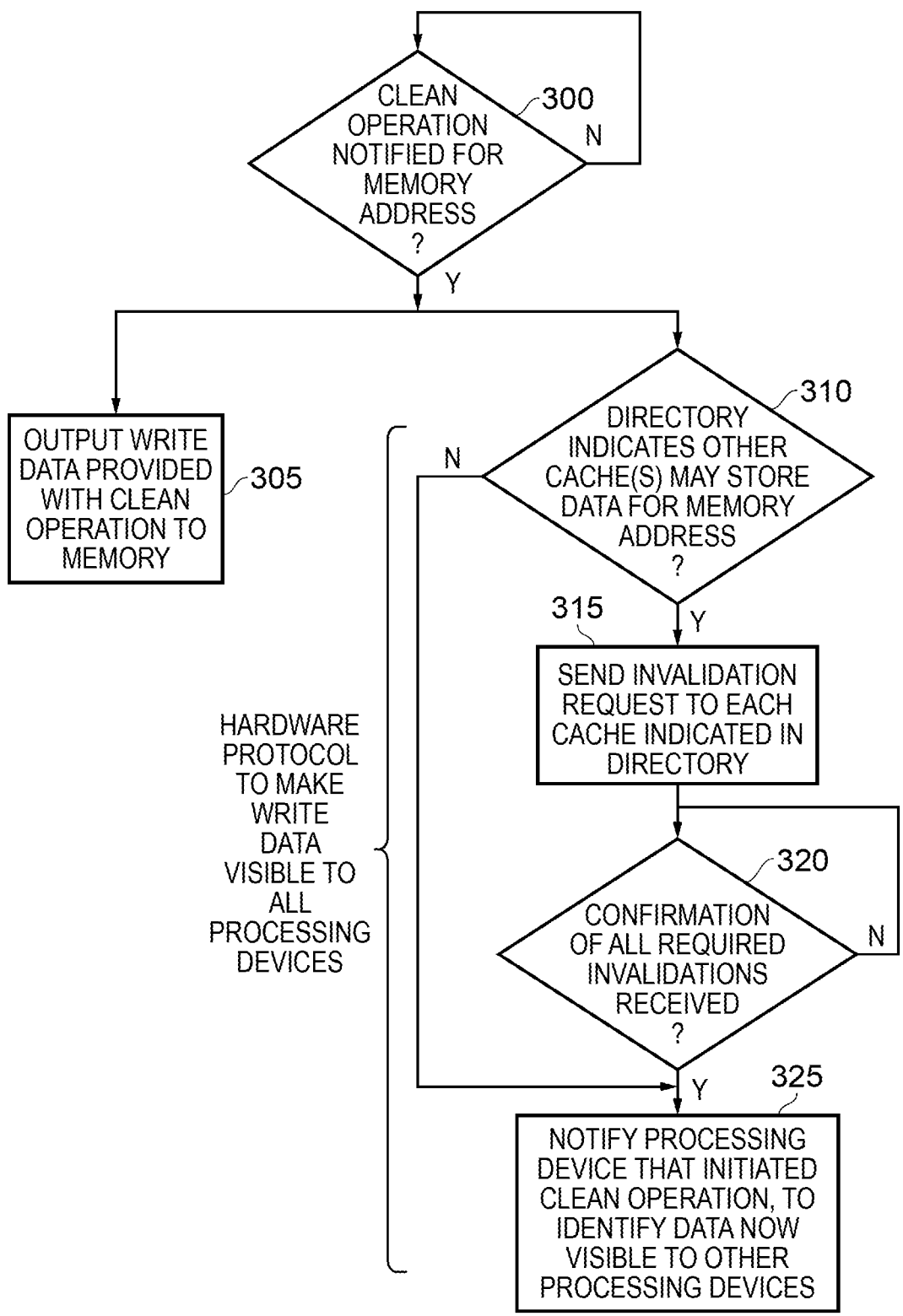
FIG. 5 is a flow diagram illustrating steps performed by the coherency circuitry in one example arrangement, in response to a clean operation initiated by a processing device that has performed one or more write operations.

FIG. 5 is a flow diagram illustrating the operation of the coherency circuitry 50 in one example. At step 300, the coherency circuitry 50 awaits notification of a clean operation from the processing device that is performing the steps discussed earlier with reference to FIGS. 4A and 4B. Upon notification of the clean operation, the coherency circuitry causes the associated write data to be propagated on to memory 70 at step 305 in order to cause the memory contents to be updated. In parallel, the process proceeds to step 310, where the directory 60 is referred to in order to identify which other caches, if any, may store data for the memory address associated with the clean operation. The snoop controller 55 is then arranged to send an invalidation request to each cache indicated by the directory information at step 315. The invalidation request will identify the memory address in question, and will cause the local cache receiving that invalidation request to perform a lookup operation in order to identify whether there is in fact an entry caching a copy of the data at that memory address, and if so that entry will be invalidated. This will ensure that the associated processing device will no longer receive a hit within the local cache if it requests the data at that memory address, and instead the correct data will be retrieved from memory 70.

Whilst in the described example invalidation requests are sent by the snoop controller 55 to the relevant local caches at step 315, in an alternative approach update requests could be sent along with the new write data, in order to cause the local cache contents to be updated to correctly reflect the required data.

At step 320, the snoop controller 55 awaits confirmation that all of the required invalidations have taken place. Once that confirmation has been received, then at step 325 the snoop controller can notify the processing device that initiated the clean operation, to identify that the data is now visible to the other processing devices. It should be noted that if at step 310 the directory indicates that none of the other caches may store data for the required memory address, the process can proceed directly from step 310 to step 325.

In instances where the clean operation is applied in respect of multiple memory addresses, such as would be the case when using the earlier mentioned begin and end instructions, then invalidation requests can be sent to the required caches for each of the updated cache line contents, and at step 320 the snoop controller would await confirmation that all of the required invalidations in respect of all of the updated data values has taken place prior to proceeding to step 325.

It will be appreciated that steps 310 to 325 are initiated entirely by the coherency circuitry 50, and do not require any visibility to the software programmer, and in particular do not require any explicit instructions to be executed by any of the processing devices. Hence, it can be seen that steps 310 to 325 implement a hardware protocol in order to make the write data visible to all of the processing devices.

Whilst the actual writing of the data output at step 305 to memory may take many clock cycles, the write data will typically reach a point of coherence (for example one or more write buffers associated with the interface to memory) soon after it has been propagated from the cache to the interconnect 40. In FIG. 5 it is assumed that a point of coherence is reached at least by the time the check at step 310 has been performed, and accordingly by the time step 325 is reached it is understood that the write data will be available from the point of coherence, even if it has not yet been written back to main memory.

Figure 6:
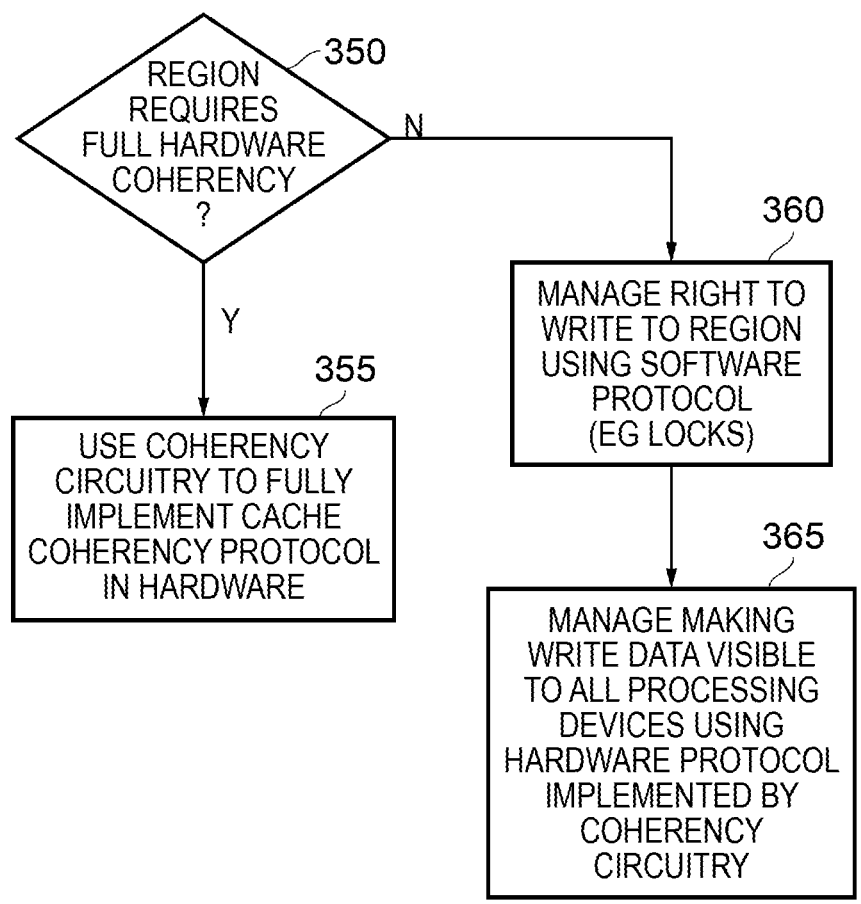
FIG. 6 is a flow diagram illustrating how the coherency mechanism employed by the system of FIG. 1 can be made dependent on the memory region to which write operations are to be performed.

Whilst the above described mechanism, which uses a combination of a software protocol and a hardware protocol to implement the required cache coherency protocol, can be implemented in respect of all of the memory regions of the memory 70 that may be shared between the processing devices, in an alternative example such an approach may be used for some regions, but full hardware cache coherency may be implemented for others if desired. This is indicated schematically by the flow diagram of FIG. 6. In particular, it is determined at step 350 whether the region in question requires full hardware coherency. If so, the process proceeds to step 355 where the coherency circuitry is used to fully implement the cache coherency protocol in hardware. In particular, existing snoop mechanisms can be used that not only implement the above described steps in response to clean operations, in order to ensure that updated data is visible to all of the processing devices, but also, prior to any processing device performing a write operation, perform coherency actions in respect of the local caches to ensure that the processing device wishing to perform the write operation has a cached copy that is marked as being exclusive to that processing device. Such an approach hence enables the establishment of the right for writing data to be embedded within the hardware protocol performed by the coherency circuitry 50. Any known hardware cache coherency scheme can be used at step 355.

However, if the region does not require full hardware coherency, the process proceeds to step 360 where the right to write to the region is managed using the earlier described software protocol technique, with reference to the locks 80 in memory 70. Then, at step 365, the steps required to make updated write data visible to all of the processing devices is managed using the hardware protocol discussed earlier, and implemented by the coherency circuitry 50.

FIGS. 7A to 7D illustrate example instruction sequences that may be executed by a processing device having a local writeback cache in situations where the software protocol and hardware protocol are used in combination to implement cache coherency. As shown in FIG. 7A, a single write instruction and associated clean instruction may be executed between the get lock and release lock instructions. In an alternative arrangement, as illustrated in FIG. 7B, the earlier mentioned begin and end instructions can be used to identify a group of write instructions, with the end instruction being used to initiate a clean operation in respect of all of the write data produced by the series of write instructions. FIGS. 7C and 7D illustrate further alternative arrangements which are a variant of the arrangement shown in FIG. 7A, and in particular where multiple write and associated clean instructions are executed between the get lock and the release lock instructions. It should be noted from FIG. 7D that the clean instruction associated with a particular write instruction does not necessarily need to immediately follow the write instruction in the sequence.

Figure 8:
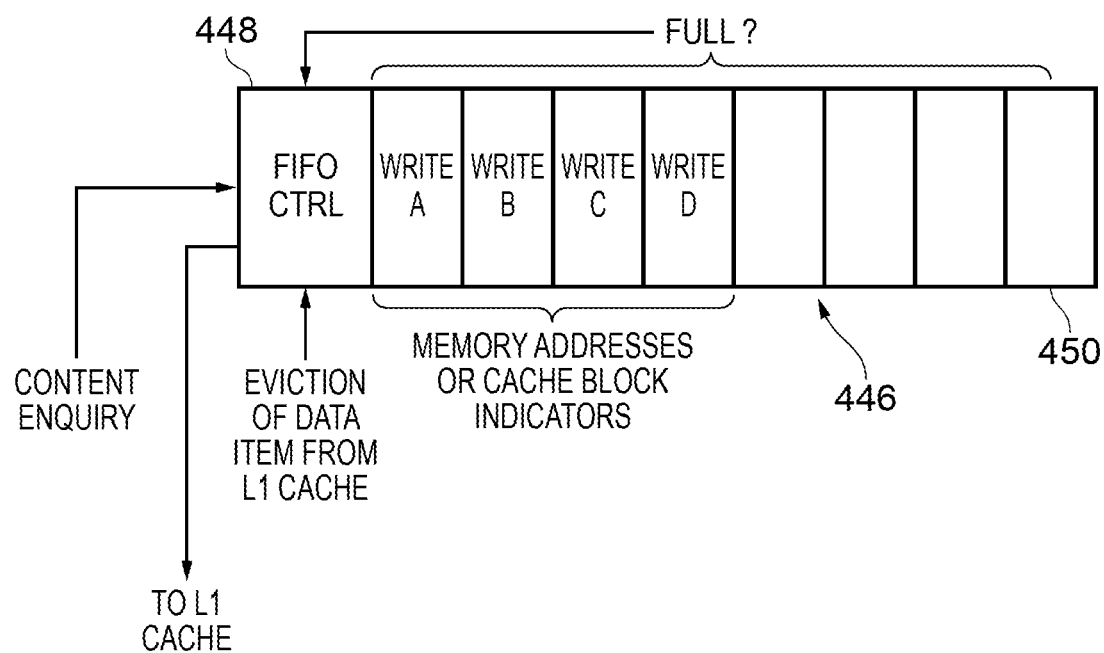
FIG. 8 illustrates a FIFO (first-in-first-out) storage that may be provided in one or more processing devices in one example arrangement, to keep track of write operations which need to be cleaned.

As mentioned earlier, in example arrangements where the earlier mentioned begin and end instructions are used, a storage unit may be provided in association with the processing device that executes a sequence of instructions including such begin and end instructions, so as to maintain indications of the write operations performed by the processing device between the begin instruction and the end instruction. FIG. 8 illustrates one example arrangement of such a storage unit, where the storage unit takes the form of FIFO storage circuitry 450.

When a write instruction is encountered which is sandwiched by a begin instruction and an end instruction, the processing device indicates to the FIFO control 448 and the associated writeback cache that an indication of the write operation to be performed in response to this write instruction should be added into an entry of the FIFO storage 446. FIG. 8 shows an example configuration in which four entries of the FIFO storage 446 are currently populated with indications of write operations A-D. As indicated in the figure these indications can comprise target memory addresses of the write operations (or indeed only partial memory addresses, where such is sufficient to identify a corresponding entry in the writeback cache) or may instead be cache block indicators, showing where the corresponding entry is to be found in the writeback cache. The FIFO control unit 448 maintains overall control of the FIFO storage 446, administering the addition of entries and the deletion of entries (either individually or the entire content of the FIFO) as required. Where the FIFO storage circuitry 450 is required to respond to an enquiry from the writeback cache as to whether a particular data item in the writeback cache has a corresponding entry in the FIFO storage 446, the FIFO storage circuitry 450 can be configured in a content addressable fashion in order to provide this functionality. One example of when such an individual enquiry may be received is on the eviction of a data item from the writeback cache, in response to which FIFO control 448 can be configured to cause a corresponding entry in the FIFO storage 446 to be removed. Alternatively, a content enquiry from the writeback cache may be received in response to a snoop enquiry received by the writeback cache as part of its participation in a cache coherency mechanism, although as will be described below with reference to FIG. 9, the writeback cache itself may be configured to store an indication of whether a corresponding entry is currently held in the FIFO storage 446 in order to avoid the necessity for the FIFO storage 446 to be provided with this content addressable memory configuration and thus facilitate the provision of the FIFO storage 446 as a relatively small addition to the processing device. Finally, as shown in FIG. 8 the FIFO control 448 is further configured to monitor if the FIFO storage 446 becomes fully populated (and therefore further entries will not be able to be made). In the event that the FIFO storage 446 is fully populated, FIFO control 448 signals this fact to the writeback cache, causing the corresponding entries in the writeback cache to then promptly be written back to the memory 70, and the content of the FIFO 446 is cleared.

Figure 9:
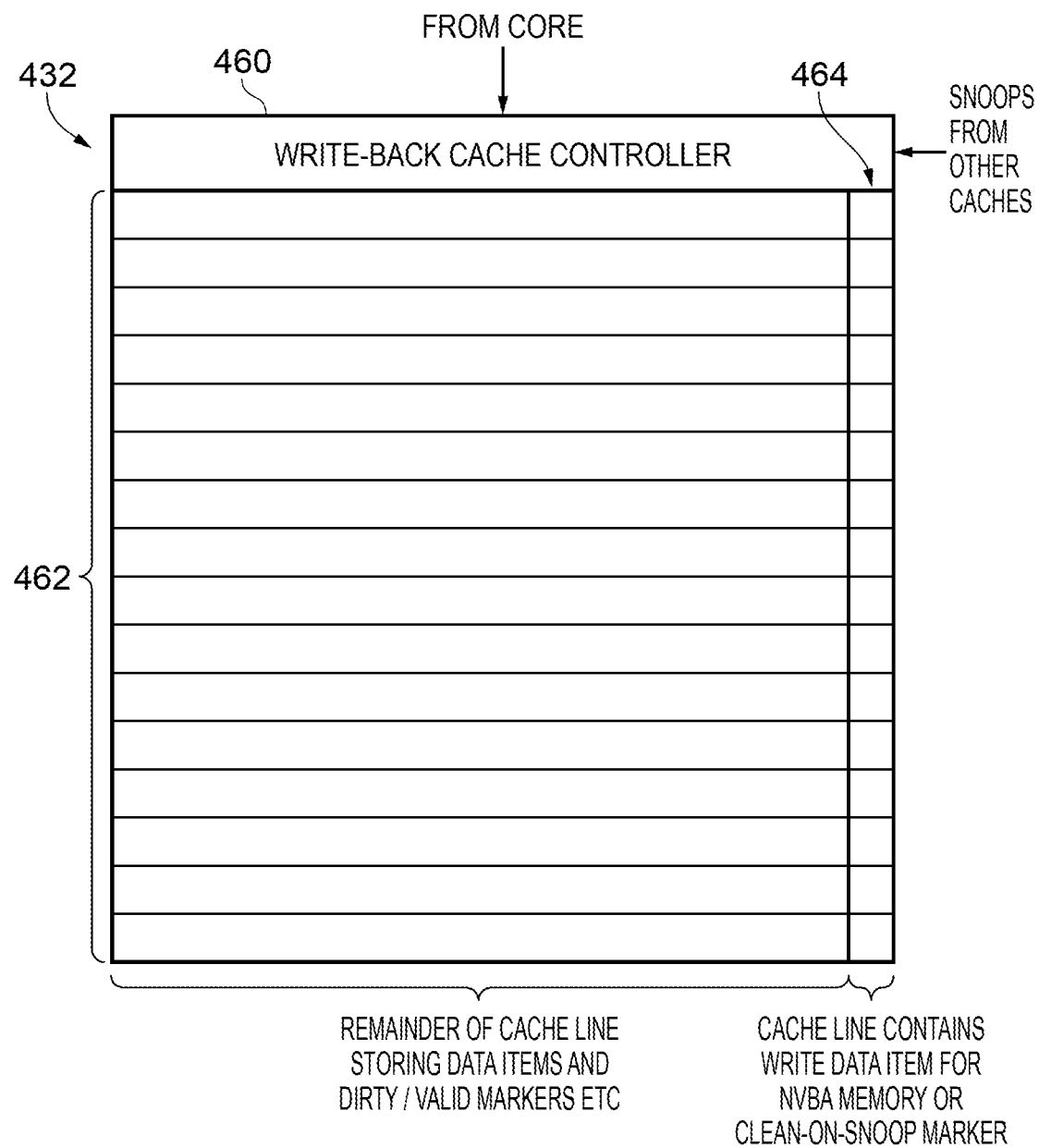
FIG. 9 schematically illustrates a writeback cache in one example arrangement.

FIG. 9 schematically illustrates a writeback cache 432, showing that this writeback cache has a controller 460 and a number of cache lines 462. The cache controller 460 monitors data items and control signals received from the associated processing device, the control signals being received both from the processing device's pipeline and from the FIFO control 448. The cache lines 462 are configured to store the data items used by the processing device in its data processing operations and each cache line stores both the data items themselves and associated status markers (dirty/valid and so on in the usual fashion). However, note that in addition one bit of each cache line is defined here as a special purpose marker 464 which can be treated as a clean-on-snoop marker, wherein if a snoop is received from another cache/CPU which hits in one of the cache lines 462 the presence of the marker 464 causes that cache line to be cleaned to memory. Eviction of the cache line is just one such example, for which the marker 464 can thus be viewed as a clean-on-evict marker. In the configuration illustrated the cache controller 460 is configured to monitor the snoops received from other caches in the system, and when a snoop from another cache is received relating to a data item stored in a cache line 462 of the cache 432 for which the marker 464 is set, the cache controller 460 is configured to immediately cause that cache line to be evicted. This event is also signalled to the FIFO control 448 such that any corresponding content in the FIFO storage 446 can be cleared.

Figure 10:
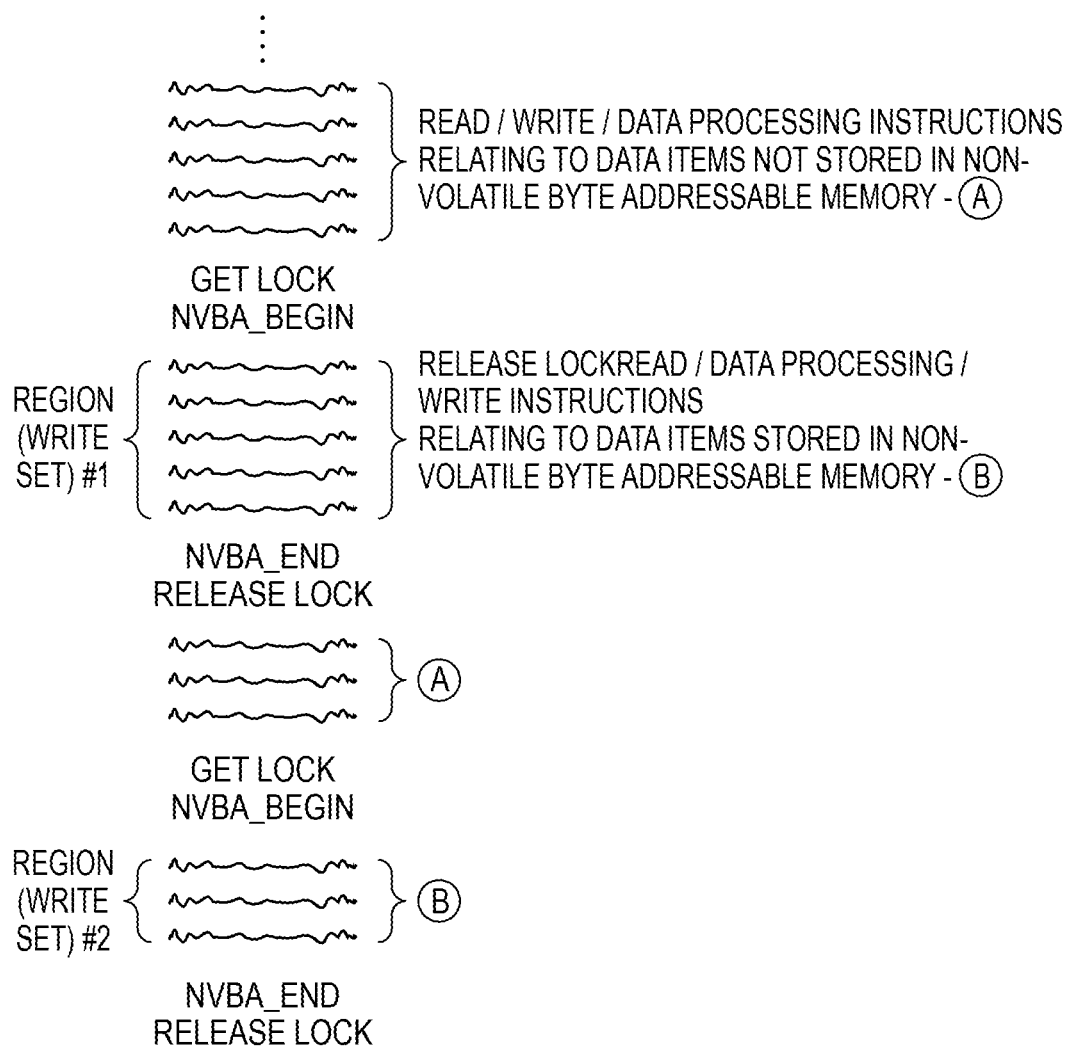
FIG. 10 shows an example sequence of instructions which a data processing device may execute in one example.

FIG. 10 shows an example sequence of instructions which may be executed by the processor device in one example. In this case, it is assumed that the begin and end instructions are used to identify a series of writes to be performed to non-volatile memory forming a point of persistence within the system. In particular, the non-volatile memory may be non-volatile byte addressable (NVBA) memory. The first portion of the sequence (labelled A), has a number of instructions which relate to read, write and data processing instructions which access data items which are not stored in the non-volatile byte-addressable memory. Thereafter follows a nvba_begin instruction (an example of the earlier mentioned begin instruction) defining the beginning of a first region (write set) in which the read, data processing and write instructions relate (at least in part) to data items which are stored in the non-volatile byte-addressable memory. This first region (write set) (labelled B) concludes with the nvba_end instruction (an example of the earlier mentioned end instruction). Thereafter follows a second set of instructions (A) which do not relate to data items stored in the non-volatile byte-addressable memory. Finally a second region (write set) of read, data processing and write instructions (B) relating (at least in part) to data items stored in the non-volatile write addressable memory is defined by a second nvba_begin instruction and a second nvba_end instruction. The provision of the nvba_begin and nvba_end instructions enable the programmer to define write sets, the ordering of which (with respect to one another) the present techniques can preserve, even when the accessed data items are stored in non-volatile memory, access to which is cached by a writeback cache.

In accordance with the techniques described herein, each of the blocks identified by the begin and end instructions are preceded by a get lock instruction, and followed by a release lock instruction, so that the earlier mentioned software protocol mechanism can be used to ensure that the processing device obtains the right to write before performing any of the write operations. As a result, the hardware protocol incremented by the coherency circuitry only then needs to ensure that the write data is made visible to the various other processing devices once the clean operation triggered by the end instruction takes place.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
a first processing device to execute a sequence of instructions, said sequence comprising at least one instruction to activate a software protocol to establish an ownership right for writing data to a first memory region, and at least one write instruction executed following establishment of the ownership right, in order to perform one or more write operations to output write data for storage in at least one memory location within the first memory region;
a writeback cache associated with the first processing device and arranged to store the write data output during the one or more write operations; and
coherency circuitry coupled to the writeback cache and to at least one further cache associated with at least one further processing device;
wherein:
the first processing device is responsive to a trigger event to initiate a clean operation in order to cause the write data to be written from the writeback cache to memory;
the software protocol is arranged to regulate read access to the first memory region by the at least one further processing device during a period between establishment of the ownership right for the first processing device and performance of the clean operation; and
operation of the coherency circuitry is deferred until the clean operation is performed, wherein the coherency circuitry is responsive to the clean operation to interact with said at least one further cache to implement a hardware protocol in order to make the write data visible to said at least one further processing device.

2. An apparatus as claimed in claim 1, wherein the apparatus implements a cache coherency protocol in respect of the first memory region through a combination of the software protocol triggered by the first processing device and the hardware protocol implemented by the coherency circuitry.

3. An apparatus as claimed in claim 1, wherein the coherency circuitry is arranged, in response to the clean operation, to cause the at least one further cache to invalidate any cache entry whose content is associated with the at least one memory location of the write data.

4. An apparatus as claimed in claim 1, wherein:
said at least one further cache comprises a plurality of caches;
the coherency circuitry maintains a record providing, for each cache in said plurality, an indication of the memory locations whose data is cached by that cache; and
the coherency circuitry is arranged to reference the record when determining which caches amongst said plurality to interact with in order to make the write data visible to the at least one further processing device.

5. An apparatus as claimed in claim 4 wherein the coherency circuitry is snoop circuitry.

6. An apparatus as claimed in claim 1, further comprising:
lock storage to maintain lock indications for a number of memory regions; and
the software protocol is arranged, when activated by the first processing device, to determine whether a lock indication for the first memory region is clear, and in the event that the lock indication for the first memory region is clear, to set the lock indication for the first memory region and to identify to the first processing device that the first processing device has the ownership right for the first memory region.

7. An apparatus as claimed in claim 1, wherein upon notification from the coherency circuitry that the write data has been made visible to the at least one further processing device, the first processing device is arranged to release the ownership right.

8. An apparatus as claimed in claim 1, wherein the trigger event comprises one of:
execution by the first processing device of a cleaning instruction in the sequence that initiates the clean operation; and
an eviction event triggered in respect of an entry of the writeback cache containing the write data.

9. An apparatus as claimed in claim 8, wherein the cleaning instruction identifies a particular entry of the writeback cache whose data is to be cleaned.

10. An apparatus as claimed in claim 8, wherein the cleaning instruction triggers cleaning of multiple entries of the writeback cache, and the apparatus further comprises a storage unit to store information enabling the multiple entries to be identified.

11. An apparatus as claimed in claim 10, wherein:
the storage unit is arranged to store indications of the write operations performed by the first processing device;
the cleaning instruction is an end instruction in the sequence of instructions, and the first processing device is responsive to execution of the end instruction by:

causing the write data that is the subject of each write operation for which an indication is stored in the storage unit to be cleaned from the write-back cache to the memory; and clearing the indications of the write operations stored in the storage unit.

12. An apparatus as claimed in claim 11, wherein the memory is non-volatile memory forming a point of persistence, and execution of the end instruction causes the write data to be propagated to the point of persistence.

13. An apparatus as claimed in claim 11, wherein the first processing device is further arranged to cause the indications of the write operations performed by the first processing device to be stored in the storage unit after a begin instruction in the sequence of instructions.

14. An apparatus as claimed in claim 13, wherein the first processing device is arranged to only perform a write operation to the first memory region when the ownership right for writing data to the first memory region has been established, and a pending write instruction specifying a memory location within the first memory region is preceded by the begin instruction and followed by the end instruction.

15. An apparatus as claimed in claim 2, wherein for at least one further memory region, the cache coherency protocol is implemented solely by the coherency circuitry, and the first processing device is arranged to obtain exclusive write access to the at least one further memory region via steps performed by the coherency circuitry in respect of the at least one further cache.

16. A method of handling write operations in an apparatus having a first processing device, a writeback cache associated with the first processing device, and coherency circuitry coupled to the writeback cache and to at least one further cache associated with at least one further processing device, the method comprising:

executing on the first processing device at least one instruction to activate a software protocol to establish an ownership right for writing data to a first memory region, and at least one write instruction executed following establishment of the ownership right, in order to perform one or more write operations to output write data for storage in at least one memory location within the first memory region;

storing within the writeback cache the write data output during the one or more write operations;

responsive to a trigger event, causing the first processing device to initiate a clean operation in order to cause the write data to be written from the writeback cache to memory;

employing the software protocol to regulate read access to the first memory region by the at least one further processing device during a period between establishment of the ownership right for the first processing device and performance of the clean operation;

deferring operation of the coherency circuitry until the clean operation is performed; and responsive to the clean operation, causing the coherency circuitry to interact with said at least one further cache to implement a hardware protocol in order to make the write data visible to said at least one further processing device.

17. An apparatus comprising:

first processing means for executing a sequence of instructions, said sequence comprising at least one instruction to activate a software protocol to establish an ownership right for writing data to a first memory region, and at least one write instruction executed following establishment of the ownership right, in order to perform one or more write operations to output write data for storage in at least one memory location within the first memory region;

a writeback cache means associated with the first processing means, for storing the write data output during the one or more write operations; and coherency means for coupling to the writeback cache means and to at least one further cache means associated with at least one further processing means;

wherein:

the first processing means, responsive to a trigger event, for initiating a clean operation in order to cause the write data to be written from the writeback cache means to memory;

the software protocol is arranged to regulate read access to the first memory region by the at least one further processing means during a period between establishment of the ownership right for the first processing means and performance of the clean operation; and operation of the coherency means is deferred until the clean operation is performed, wherein the coherency means is responsive to the clean operation, arranged to interacting with said at least one further cache means to implement a hardware protocol in order to make the write data visible to said at least one further processing means.

* * * * *